May 10, 1966 P. N. HANEBUTH 3,250,088
TIP ASSEMBLY FOR A FLEXIBLE SHAFT ASSEMBLY
Filed April 30, 1965 2 Sheets-Sheet 1
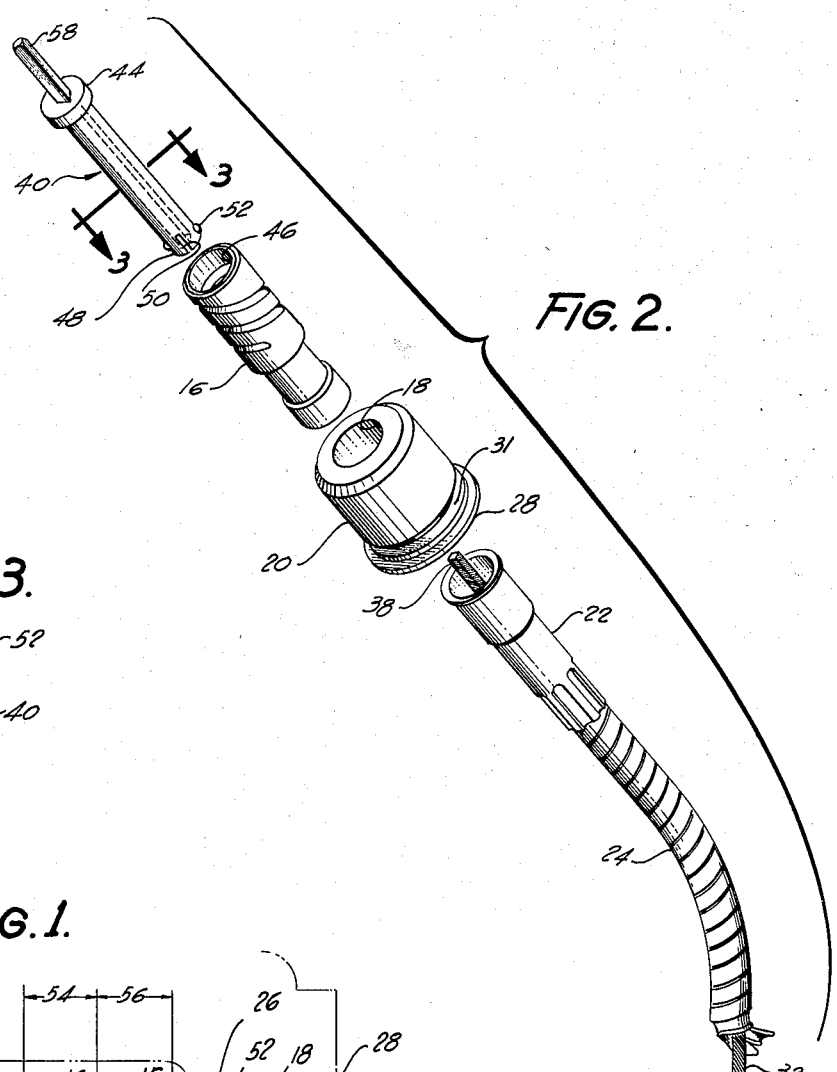
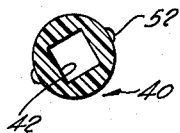
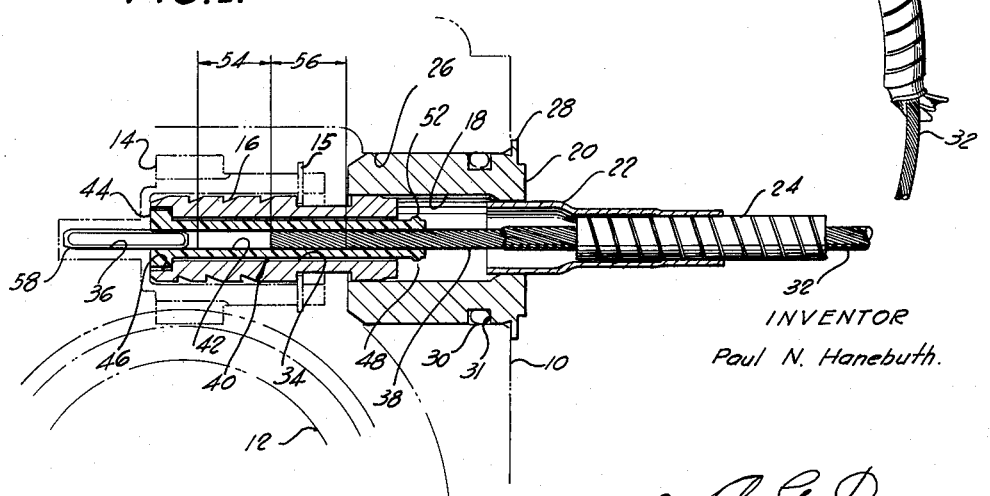
INVENTOR
Paul N. Hanebuth.
By A. G. Douvas
Attorney May 10, 1966  P. N. HANEBUTH  3,250,088
TIP ASSEMBLY FOR A FLEXIBLE SHAFT ASSEMBLY
Filed April 30, 1965  2 Sheets-Sheet 2

INVENTOR
Paul N. Hanebuth.

By Norton Lesser
Attorney.

United States Patent Office 3,250,088
Patented May 10, 1966

3,250,088
TIP ASSEMBLY FOR A FLEXIBLE SHAFT
ASSEMBLY
Paul N. Hanebuth, Elmhurst, Ill., assignor to Stewart-Warner Corporation, Chicago, Ill., a corporation of Virginia
Filed Apr. 30, 1965, Ser. No. 453,568
9 Claims. (Cl. 64—4)

This application is a continuation-in-part of applicant's copending application Serial No. 262,008, filed March 1, 1963, and now abandoned, and relates to coupling assemblies for flexible shafts, and more particularly to apparatus for maintaining a constant extension or projection of the drive tip from a flexible shaft assembly.

A flexible shaft assembly commonly includes an outer protective casing and an inner flexible core or shaft rotatably carried within the casing. The flexible core is usually squared at its ends to permit keyed engagement with rotatable sockets at spaced apart driving and driven machine components for transmitting movement therebetween. Couplings may also be engaged on the core ends for receipt within the sockets. In any event the length of the routing path traversed by the core must be maintained within close tolerances or the overlap between the core or coupling and the socket will interfere with proper operation.

Excessive variation in the overlap, either in an increasing or a decreasing sense, causes serious operational defects. If for example the core or coupling should bottom on the socket, not only will the loading on the end bearings of the receiving components be increased, but the core will buckle to increase side loading and possible whipping against the casing. Core retraction on the other hand can cause insufficient overlap or contact area between the socket and core or torque transmission and shear failure may occur.

Flexible shaft assemblies commonly are designed for a particular application and are fabricated to the casing and core lengths required. In such cases, the proper core extensions must be maintained within the close predetermined limits mentioned above. Also, because of the uneven variation in lengths of the core and casing usually encountered upon transverse bending of the assembly, the acceptable variation of the core extension is exceeded and the shaft assembly must be rejected. Consequently, despite extreme care taken in the fabrication of the flexible shaft assembly, improper core extension is both a continuing and expensive problem.

Alternatively, the core can be made to excessive length and trimmed on the installation site after the shaft assembly is routed as required. However, this necessarily results in additional length cores to increase the cost of the core and places discretioning fabrication in the hands of persons sometimes of marginal skills.

Accordingly, one object of this invention is to provide an attachment for one or both of the ends of a flexible shaft assembly which is effective to minimize or to eliminate all problems relating to improper core extension.

Couplings are often used on the core ends when large stresses are involved such as occur in operating truck speedometers. The coupling provides improvement in the torque transmission between the elements and the core over that provided by the squared end of the core alone. Since the ends of the core lie within the casing and the couplings are secured thereto, the usual practice is to attach the couplings to the core, before the core is inserted into the casing. As the maximum radial dimension of the coupling is larger than the core, the casing has to be made of corresponding larger diameter than the core with attendant disadvantages.

When the flexible shaft is assembled in a truck, a projecting end or tip on one of the couplings is first inserted in a corresponding recess of the speedometer and the casing is fixed at the corresponding end to the appropriate housing. The tip on the coupling at the other end of the core is inserted in a socket or recess in the speedometer driving element at the truck transmission; however, if the irregular surface of the tip is not properly aligned with a corresponding surface in the recess, the coupling and core are pushed back into the large diameter casing. As the installer is not immediately aware of this condition, the core and tip may snake back some distance into the casing and a considerable nuisance ensues in retrieving the same and again inserting the driving tip.

If the couplings are rotatably carried by the casing but fixed against axial movement, the couplings can be assembled separately from the shaft to permit the use of a smaller diameter casing, while misalignment of the coupling and recess during installation will not push the shaft back into the casing. At the same time rendering the shaft axially movable with respect to the end couplings avoids the aforementioned problems resulting from variations in the routing path taken by the shaft.

It is, therefore, another object of the present invention to provide an ecomonical, facilely assembled structure for locking a flexible shaft coupling to a flexible shaft casing with the coupling being rotatable with respect to the casing for transmitting rotatable movement between the core and coupling.

Another object of this invention is to provide an attachment for a flexible shaft assembly which guarantees proper interlocking tip engagement with the driving and driven machine components independently of the actual core extension.

These and other objects will be more fully appreciated after a review of the specification including the accompanying drawing, wherein:

FIG. 1 is a cross-sectional view of a typical flexible shaft assembly showing one embodiment of the subject invention;

FIG. 2 is an exploded perspective view of the operative components of the invention shown in FIG. 1;

FIG. 3 is a cross-sectional view of the tip insert as seen generally from line 3—3 of FIG. 2;

Figure 4:
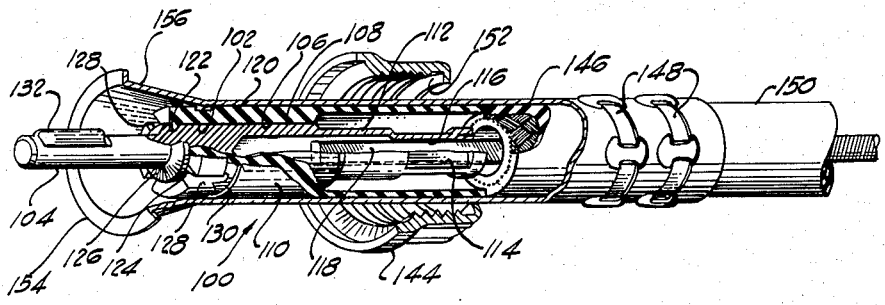
FIG. 4 is a partial sectional perspective view illustrating another embodiment of a flexible shaft coupling assembly.

FIG. 1 shows in cross-section a typical drive connection used from an automotive transmission through a flexible shaft assembly to the speedometer of the vehicle (not shown). The transmission (shown in phantom) includes a casing 10 having therein a worm or drive gear 12 which engages a pinion 14. The pinion is supported to rotate on shaft or bearing 16 and retained thereon by a snap washer 15. The bearing 16 is secured within bore 18 of bushing or plug 20 which in turn is secured onto the end ferrule 22 of the shaft casing 24. The plug 20 is received within bore 26 of casing 10 until abutment of lip 28 thereon, and is secured in place by a clamp or the like (not shown). Oil ring 30 received within annular recess 31 in the plug 20 seals the assembly. The flexible core 32 of the flexible shaft assembly extends from casing 24, through ferrule 22 and bore 18 of the plug 20, to within tubular passage 34 in bearing 16.

The pinion 14 riding on bearing 16 has a receiving socket or bore 36 which is of complementary shape and size as the squared cross-section 38 of the core 32 for establishing a torsional interlocking fit therewith. In designs before the subject invention, the core tip 38 extended directly into the socket 36. The projection of the core 32 relative to the casing thus had to be within close limits and corresponds generally to the depth of the socket 36. Since the length or depth of the socket 36 is generally only of the order of ⅜ to ½" for a conventional .130" diameter core assembly, the tolerable core variation was extremely small. As mentioned above, excessive core extension causes the core to bottom out on the pinion 14 and the corresponding socket assembly at the opposite end of the flexible shaft to increase friction losses, wear and the noise level. In the opposite sense, excessive core retraction causes inadequate overlap or biting area and consequent shear failure of the assembly.

The subject invention overcomes or minimizes all of these defects by means of the simple incorporation of a tube member 40 received within the bore 34 of bearing 16. The bushing or shaft 40 is elongated and of circular cross-section, as seen at FIG. 3, and has a square bore 42 or of such contour to complement cross-sectional 38 of the core 32. The tube 40 fits rotatably within bore 34 of the bearing 16, and is provided at its outer end with an annular shoulder 44 receivable within an annular recess 46 of bearing 16 and at its inner end with detent means 48. The tube 40 can be made of a durable plastic material, such as a poly-acetal resin, so that the detent 48 can be formed by axially slitting the side walls as at 50 and providing a radial protuberance 52 between such slits. The projections 52 are of greater radial dimension than the bore 34 but because of the resiliency of the slit side walls they can be forced through the bore until they emerge from the inner end into the larger bore 18 of the plug 20. The tube 40 thus is confined axially within the bearing 16 by abutment of its shoulder 44 and projection 52 against the opposite ends of the bearing.

The core 32 is adapted to fit within and complement the bore 42 of the tube 40 along the length of the bore. The tube 40 can be inserted into the open ends of bore 34, rotated slightly if necessary to receive the projected end of the core 32, and thereafter be fully inserted until the detent means 48 clears the bearing 16. As shown in FIG. 1, the core will normally be at some axial extent within the bushing or shaft 40. Any variation of the core projection within the limits designated by the arrows 54 to 56 are thus tolerable there being no binding of the core against the tube, while still having a sufficient overlap or bite against the inner end of the bushing.

A pin or drive tip 58 is press fit or otherwise secured to the end of the bushing 40 centrally thereof and is of sufficient length to complement the socket 36. Thus regardless of the extension of core the projection of the pin 58 in the socket is proper. The actual extension of the core 32 within the tube 40 is tolerated at least within the limits 54 and 56, as shown, with no adverse effects. In actual use, a go-no go gauge inserted into the open end of the bore 34 can be used to determine if the projection of the core is within the acceptable limits.

While the subject invention has been shown on a flexible shaft assembly specifically used with an automotive vehicle transmission, and thus encumbering the bushing 20, bearing 16 and the pinion 14, the invention obviously can be applied to other designs. Thus the end structure of the flexible shaft can be only slightly more complicated than a conventional ferrule 22 having provision therein for inserting, supporting and retaining the tube member 40. The core 32 thus can cooperate in telescoping relationship with the bushing 40 within the wide limits of variation while the end pin 58 has a constant projection. This ensures positive and proper tip engagement with the receiving socket of the driven machine components independently of actual core extension relative to the casing. Also, the attachment can be provided in a flexible shaft assembly with little additional cost, and will actually reduce the cost because of the reduced shaft rejections.

Since the tube 40 is of extended axial length and fits complementarily within the end structure of a flexible shaft assembly, the drive pin 58 is maintained uniformly centered of the casing. Thus any tendency of whipping of the end projection of the core as previously encountered in flexible shaft assemblies is minimized or eliminated. The tube also acts as a bearing to absorb side thrust of the core within the assembly. The assembly can be made of a plastic, for example, and thus requires no lubrication nor encounter appreciable wear. Additionally, the use of the tube 40 prevents a direct communication between the transmission casing 10 and the flexible shaft assembly. The indirect and high resistance flow path past the bushing thus minimizes the pumping effects caused by rotation of the core.

Figure 5:
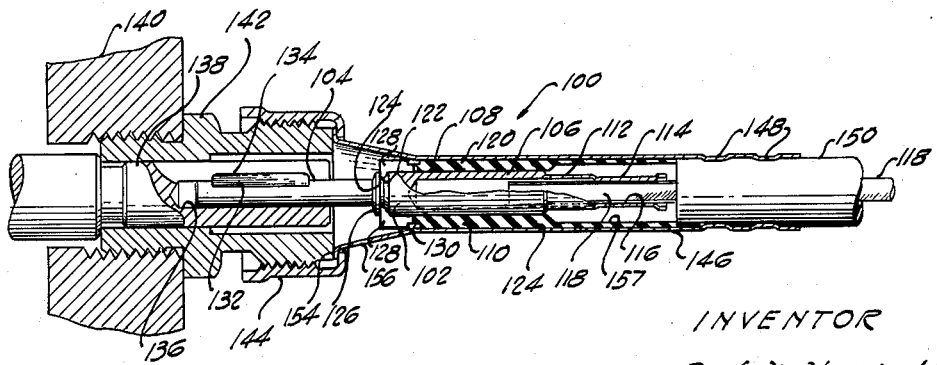
FIG. 5 is a cross-sectional view illustrating the manner in which the coupling assembly of FIG. 4 is engaged with either a driving or driven element.

In FIGS. 4 and 5 another embodiment of a flexible shaft coupling assembly is indicated by the reference character 100. The assembly 100 comprises a metallic coupling 102 having an elongate projection or tip 104 on one end and an integrally formed tubular portion 106 at its other end.

The tubular portion 106 has a large diameter outer wall surface 108 of approximately .305" diameter for rotatable engagement in a bushing 110. An outer wall surface 112 of reduced diameter approximating .282" diameter on tubular portion 106 is swaged or inwardly deformed along wall portion 114 for about .31". The deformation defines a bore 116 of irregular or substantially square cross-section. The bore 116 receives the end of a flexible shaft 118 with the end deformed to define a section corresponding to the section of bore 116. The shaft is free to slide within the bore 116 for a distance accommodating normal differences in routing length without axially loading the shaft 118 which rotates with the tubular portion 106.

The bushing 110 has a thick wall portion 120, and is formed from poly-acetal or other plastic resin, for example. A plurality of depending axially projecting teeth 122 at one edge of bushing 110 ride in a recess 124 in the coupling 102. The recess 124 is formed between the large diameter wall 108 and a peripheral flange 126 on the coupling 102. The teeth 122 prevent axial movement in opposite directions of the tip 104 and tubular portion 106. Slots 128 in bushing 110 between respective pairs of teeth 122 and a peripheral recess 130 in the outer surface of bushing 110 permit the teeth 122 to be sprung radially outwardly, when the enlarged wall surface 108 is moved past the teeth 122. The teeth 122 then spring into the recess 124 to prevent axial movement in opposite directions of the coupling 102.

The tip 104 has a tang or flange 132 approximately ½" long formed along a portion of its surface. The flange 132 engages in correspondingly shaped slot 134 in the wall of a recess 136. The recess 136 is formed in a socket or shaft projection 138 of either a driving or driven element. Movement may, therefore, be transmitted between the socket 138 to tip 104 and shaft 118 without loading the shaft and irrespective of whether the tip is axially loaded. The socket 138 is located within a housing 140, and an externally threaded nipple 142 is fixed in the housing coaxial with the socket 138.

The nipple 142 receives a nut 144 carried on the exterior of a metallic ferrule 146. The ferrule 146 has crimps 148 at one end to fasten the ferrule to a casing 150 carrying the flexible shaft 118. Since the casing need only accommodate the shaft 118, the casing diameter may conform more closely to the shaft diameter.

An internal shoulder 152 on the nut 144 presses against a flange 154 at the other end of the ferrule 146 to fasten the ferrule 146 and casing 150 to the housing 140. The flange 154 terminates a conical wall enlargement 156 at the adjacent end of ferrule 146 and the conical wall merges with an annular wall in which the bushing 110 is press fit. A thin wall section 157 on the bushing facilitates engagement with the ferrule 146.

Figure 6:
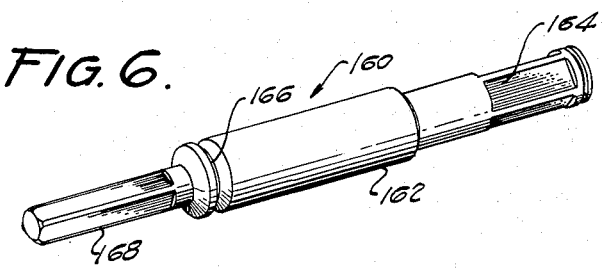
FIG. 6 is a perspective view of a coupling, such as shown in FIG. 4, with a slight modification.

In FIG. 6 a coupling 160 is shown generally similar to coupling 102. Coupling 160 comprises a tubular portion 162 which is swaged intermediate its ends as shown by wall 164 to provide a bore for rotating a flexible shaft while permitting axial movement of the flexible shaft. A peripheral recess 166 is provided intermediate the tubular portion 162 and a tip 168 integrally formed thereon. This recess permits the coupling to be engaged by the teeth such as 122 of a bushing 110 to prevent axial movement of the coupling while it is rotatably supported by the bushing. The tip 168, however, is formed with a generally square or rectangular configuration to permit engagement with a correspondingly shaped recess, such as 136, in a socket or shaft projection.

The couplings 102 or 160 considerably simplify the manufacture and installation of flexible shafts. Thus the shaft 118 and the casing 150 are formed of a length corresponding to the desired or nominal routing distance between the driving and driven elements. A coupling is fitted to one end of the shaft and the shaft and coupling inserted in one end of the casing. A ferrule 146 is fastened to the other end of the sheath or casing, and a bushing 110 is press fit therein. The tubular portion of either a coupling, such as 102 or 160, is now moved past the teeth 122, and the teeth seat in recess 124. If the irregularly shaped bore 116 is not properly aligned with the corresponding shape of shaft 118, the shaft or tip at the opposite end will be projected from the casing. The assembler notes this condition and rotates the projected tip and shaft while applying slight pressure thereto. With the nonaligned coupling being held by the teeth 122, it is prevented from moving axially, and as soon as the shaft 118 is properly aligned with bore 116, and the shaft simply moves into the bore, and the assembly is completed.

When the flexible shaft is installed on a vehicle, the tip at one end is usually connected to the speedometer, and the casing fastened to the appropriate housing. The tip 104 or 168 at the other end is now inserted in the appropriate recess of the socket 138. If alignment is improper, the installer will note this immediately by the failure of the ferrule 146 to move into engagement with the nipple. Since the teeth 122 prevent the tip 104 from moving back into the ferrule, no question about proper alignment or retrieval of the tip occurs. As soon as the tip 104 is properly aligned, the ferrule flange 154 is moved forward to engage nipple 142. The nut 144 may now be fastened in position. An excess or deficiency between the core length and the routing distance will be accommodated by axial movement of the core in the coupling bore 116 without any axial load on the shaft. Since the distance of the projection of the tip 104 into the recess 136 is fixed by its position relative to the ferrule and the location of the ferrule is fixed relative to the recess 12, proper engagement between the tip 104 and the socket 138 is easily secured.

It will be readily appreciated that various modifications of the invention are possible and that the invention is defined by the following claims.

What is claimed is:

1. For use in a flexible shaft assembly having an outer sheath fixedly coupled at opposite ends to spaced apart housings with one of said housings having a driving element with a coupling recess of fixed length and the other housing having a driven element and said sheath carries a flexible shaft for transmitting motion between said driving and driven elements with the routing distance between said elements being only approximately known, the improvement comprising a bearing for rotatably carrying said driving element and having an elongated bore, a tubular member rotatably supported in said bore and receiving said flexible shaft in one end for a distance accommodating normal variations in said approximately known distance while transmitting motion to said shaft in response to the rotation of said member in said bearing, peripheral enlargements adjacent opposite ends of said tubular member with the enlargements adjacent one end of said member radially displaced for permitting passage of said member through said elongated bore and expanded after passage through said bore to limit axial movement of said tubular member in said bore, and a pin protruding from the other end of said tubular member for a distance corresponding to the fixed length of said recess and engaged in said recess for transmitting motion from said driving element to said tubular member and flexible shaft.

2. For use in a flexible shaft assembly having an outer sheath fixedly coupled at opposite ends to spaced apart housings with one of said housings having a driving element with a coupling recess of fixed length and the other of said housings having a driven element and said sheath carries a flexible shaft for transmitting motion between said driving and driven elements with the distance between said elements being only approximately known, the improvement comprising a coupling member having a noncircular bore and receiving said shaft in one end of said bore with said shaft movable axially in said bore for a distance accommodating any normal variation in said approximately known distance and engaged in said bore for a length providing transmission of torsional forces from said coupling member to said shaft without axial loading of said shaft, means for rotatably supporting said coupling member while preventing axial movement of said coupling member, and a pin protruding from the other end of said coupling member bore for a distance corresponding to the fixed length of said recess and engaged with said recess to transmit motion from said driving element to said tubular member and flexible shaft whereby rotational engagement between said driving element and said shaft is provided without excessive axial loading of said shaft or insufficient torsional forces between said driving element and shaft.

3. For use with a flexible shaft of fixed length to be placed along a routing path of indeterminate length for transmitting movement between a driving element and a driven element at opposite ends of said path, a coupling assembly comprising a tube, bushing means for rotatably supporting said tube, respective integrally formed means on said bushing and tube solely cooperating for limiting axial movement of said tube, tip means engaged with one of said elements and said tube for providing a predetermined coupling area between said tube and said one element to transmit rotatable movement between said one element and tube, an axially stationary end wall associated with said one element adapted to abut said tip means engaged with said one element and tube, and means coupling said tube and shaft for transmitting rotatable movement between said tube and shaft while maintaining said tube and shaft engaged over at least a minimum coupling area without placing said shaft under axial load irrespective of any normal difference between the length of said routing path and said fixed length and the abutment of said engaged means and end wall.

4. The coupling assembly claimed in claim 3 in which said integrally formed means on said bushing rotatably supporting said tube comprises integrally formed teeth thereon for engaging said tube to limit said axial movement.

5. A coupling assembly for use with an outer protective casing carrying a flexible shaft for transmitting movement between a driving element and a driven element with one of said elements having a recess therein, the improvement comprising a bushing fixedly carried by said casing, a tube rotatably carried by said bushing, a projecting tip integrally formed on one end of said tube for receipt within said recess to transmit rotational movement between said one element and said tube, means integrally formed on said bushing for preventing movement of said tip and tube in opposite axial directions with respect to said casing, and means on said tube for transmitting rotational movement between said tube and shaft while permitting axial displacement of said shaft relative said tube without axially loading said shaft.

6. A coupling assembly for use with an outer protective casing having a bore in which a flexible core is carried for transmitting movement between a driving element and a driven element, the improvement comprising a ferrule fixed to one end of said casing, an elongated bushing press fit in said ferrule, a tubular portion rotatably supported in said bushing and having both a recess in the outer wall thereof and an irregularly shaped bore, axially projecting teeth on said bushing for engaging said outer wall recess to limit movement of said tubular portion in opposite axial directions while said irregularly shaped bore engages said core for transmitting rotatable movement between said core and tube and permits axial displacement of said core for accommodating variations in the routing distance between said elements and without end loading of said core, and drive tip means integrally formed on the end of said tubular portion opposite said core for engagement with one of said elements to establish either a driving or driven connection between said one element and core.

7. A flexible shaft assembly comprising an outer protective casing carrying a flexible core for transmitting movement between a driving element and a driven element, a ferrule fixed to one end of said casing, a bushing press fit in said ferrule, a coupling rotatably carried in said bushing for engaging one of said elements and receiving one end of said core for a distance accommodating variations in the routing distance traversed by said core without axial loading of said core for transmitting rotational movement between said core and coupling, and means integrally formed on said bushing for preventing movement of said coupling in opposite axial directions.

8. For use with a flexible shaft assembly including a ferrule fixed to one end of an outer protective casing in which a flexible core is carried for transmitting movement between a driving element and a driven element with one of said elements engaged by a coupling which receives one end of said core for a variable distance without axial loading of said core and transmits rotatable movement between said one element and core, the improvement comprising an elongated bushing press fit in said ferrule for rotatably carrying said coupling, depending axially projecting teeth on said bushing for engaging said coupling to prevent movement of said coupling in opposite axial directions, and means on said bushing for enabling said teeth to move radially outward in response to the movement of said coupling axially of said bushing and for thereafter enabling said teeth to engage said coupling.

9. The bushing claimed in claim 8 in which said means comprises a circumferentially extending recess in the outer wall of said bushing axially offset from said teeth.

References Cited by the Examiner

UNITED STATES PATENTS

| | | | |
|---|---|---|---|
| 1,812,510 | 6/1931 | Berge | 64—2 |
| 2,257,979 | 10/1941 | Rubinstein | 64—4 |
| 2,782,020 | 2/1957 | McCanless | 64—4 |
| 2,801,530 | 8/1957 | Holt | 64—3 |
| 2,884,771 | 5/1959 | Holt | 64—4 |

FOREIGN PATENTS

| | | |
|---|---|---|
| 507,920 | 6/1939 | Great Britain. |
| 884,593 | 12/1961 | Great Britain. |

BROUGHTON G. DURHAM, *Primary Examiner.*

H. C. COE, *Assistant Examiner.*